US012596783B2

(12) United States Patent
Subbloie et al.

(10) Patent No.: US 12,596,783 B2
(45) Date of Patent: Apr. 7, 2026

(54) SYSTEM AND METHOD FOR SECURING IoT COMMUNICATIONS

(71) Applicant: Budderfly, Inc., Shelton, CT (US)

(72) Inventors: Albert Subbloie, Orange, CT (US); Christopher J. DeBenedictis, Branford, CT (US); Kenneth Buda, Scarsdale, NY (US); Jaan Leemet, Aventura, FL (US); Jacob Marchinus Boerma, Orange, CT (US)

(73) Assignee: Budderfly, Inc., Shelton, CT (US)

( * ) Notice: Subject to any disclaimer, the term of this patent is extended or adjusted under 35 U.S.C. 154(b) by 261 days.

(21) Appl. No.: 18/480,747

(22) Filed: Oct. 4, 2023

(65) Prior Publication Data

US 2024/0119134 A1 Apr. 11, 2024

Related U.S. Application Data

(60) Provisional application No. 63/413,910, filed on Oct. 6, 2022.

(51) Int. Cl.
*G06F 21/00* (2013.01)
*G06F 21/44* (2013.01)

(52) U.S. Cl.
CPC .................................... *G06F 21/44* (2013.01)

(58) Field of Classification Search
CPC ....................................................... G06F 21/44
See application file for complete search history.

(56) References Cited

U.S. PATENT DOCUMENTS

| | | | | | |
|---|---|---|---|---|---|
| 5,438,367 | A | * | 8/1995 | Yamamoto | ............. H04N 23/74 |
| | | | | | 396/176 |
| 9,203,610 | B2 | | 12/2015 | Azzouz et al. | |
| 10,375,054 | B2 | * | 8/2019 | Uppalapati | ......... H04L 63/0815 |
| 2010/0286841 | A1 | * | 11/2010 | Subbloie | ............... G06F 1/3203 |
| | | | | | 700/295 |
| 2018/0260550 | A1 | * | 9/2018 | Shin | ......................... G10L 17/22 |
| 2018/0373646 | A1 | * | 12/2018 | Shwartz | .................. G06F 21/52 |
| 2019/0335042 | A1 | * | 10/2019 | Tabuki | ............... H04N 1/00477 |
| 2022/0132311 | A1 | * | 4/2022 | Zhu | ......................... H04W 12/06 |

* cited by examiner

*Primary Examiner* — Rodman Alexander Mahmoudi
(74) *Attorney, Agent, or Firm* — Farber LLC

(57) ABSTRACT

A system and method of securing access to energy reporting and controlling devices in a facility through context specific commands that are validated against anomalous activities. Should anomalies occur, secondary authentication is performed to allow for exceptions and device access can be revoked preventing intrusions whether for unauthorized monitoring or control of the system.

20 Claims, 5 Drawing Sheets

SYSTEM AND METHOD FOR SECURING IoT COMMUNICATIONS

FIELD OF THE INVENTION

The present invention relates to systems and methods for communicating with devices and energy-related sensors used in the management and collection of energy usage. Unique identifiers and machine learning are used to validate and authorize communications to ensure secure communications and control of the devices.

BACKGROUND OF THE INVENTION

Measuring energy usage has become standard practice for many companies and remote access to these devices and storage of the collected data in the cloud are commonplace.

Along with the convenience of accessing this data remotely using a variety of desktop and mobile devices comes the risk unauthorized individuals gaining access to or intercepting these communications. Having unauthorized access to this data could allow unauthorized individuals to gain insights about the business operation or allow unauthorized individuals to change settings causing operational disruptions, or even cause damage to the devices associated with the intercepted data or cause damage to items the devices are used to manage control (e.g. turning up/off the freezer could cause food to go bad).

In gaining access, it may be possible to cause damage to a device by reprograming it or even disabling authorized personnel's access to the device. The remediation of such issues can be complex, time consuming and costly for the operation. In some cases, actors may even demand payments from the rightful owners to return control of the devices. Additionally, paying these ransoms does not always solve the problem, which leads to more demands.

Even nonintrusive monitoring of energy-related data can expose business operational practices leaking proprietary and confidential business information to those that should not have access to it based on the energy-consumption data. For example, a factory running an additional shift would show an increase in power usage, and those that are curbing production would show a decline. Such information could allow an unauthorized individual to gain non-public information that could be used to gain an unfair advantage in stock trades, company valuation in M&A activity, or could even be damaging if exposed publicly.

Alternatively, not all attacks are based on industrial espionage. Some are simply malicious hackers who opportunistically gained access to a system. Once in, they may decide to do things like change the settings on a thermostat or switch the lights. All of this can disrupt a business and expose it to liability. An office may need to send staff home if the air conditioning or heating were disabled or modified. Food may spoil if cooler and freezer settings are modified. Customers may fall or bump into things in the dark and the business may be exposed to theft, liability, or bad publicity. This could result in bad publicity with customers losing confidence in the business. More drastic examples would include increasing the temperature of water to where it can burn people, not cooling cores used for key functions potentially leading to failure and even danger. Imagine water cooling pumps used to cool a nuclear reactor as an extreme case.

Even if such drastic results are not felt, the impact to a company's energy consumption can be costly. For example, much of the work and effort put towards energy savings and energy budget planning can be undone by someone changing a temperature setting on an HVAC unit so it does not go off in the evening. It may take some time for a business owner to even realize what is happening and weeks or even months of additional costs would already have accumulated.

Energy monitoring applications require a large number of endpoints to measure energy use, and as such the deployment of low-cost sensors is commonplace. In order to keep costs relatively low, the processing power and memory and available features on these devices is typically limited. The operating systems used, and available resources often precludes the ability to add circuitry or software needed to secure communications. Advanced security protocols are commonplace on higher-end devices but lacking on lower cost sensors used for energy monitoring.

It would thus be beneficial to have a system that could reliably secure the communications with these devices preventing unauthorized access to the data these devices generate or to allow for access to and control of these devices. It would further be beneficial to have such a system flag anomalous events that are atypical requiring an added layer of security to access these.

U.S. Pat. No. 9,203,610 (the '610 Patent) entitled Systems and Methods for Secure Peer-to-Peer Communications teaches how to secure communications using a unique identifier and a random number. However, the '610 patent does not teach how to predict patterns of communication or for validation. In cases where a whole device may be compromised or removed the security may be inadequate.

U.S. patent application Ser. No. 13/714,314 entitled Systems and methods for secure peer-to-peer communications (the '314 Appln.) teaches how to secure communications with a session token using an emitter application identifier. However, the '314 Appln. does not teach how to use device specific unique IDs that are tied to individual devices and does not discuss or tie security features to communications patterns.

Systems that only isolate and validate the device type or unique device ID are still prone to issues in that bad actors can gain control of the devices and issue valid commands, which conflict with expected or desired policy. Examples include shutting off the lights during business hours or modifying the settings of thermostats or temperature sensors associated with HVAC units or refrigeration units. For instance, a normally valid command when sent at the wrong time can cause disruption to a business.

Even systems that allow validation and authentication of devices may not immediately recognize intruder access or a change in behavior of any given device(s). Once access is gained, actors may even find ways to lock out valid users from the system making mitigation and recovery very difficult.

Therefore, a need exists for a way to secure communications with Internet of Things (IoT) sensors used in energy applications such that the system both authenticates the devices and provides a framework to describe expected and allowable behavior. Should commands be initiated that deviate from the expected behavior, devices can be quickly disabled or locked out from remote access and such commands should entail a secondary more secure method of validation before being permitted to ensure minimizing of any potential business disruptions.

SUMMARY OF THE INVENTION

Accordingly, it is desired to provide a system and method that secures communications from a central energy management system to remote sensors and controllers through the use of device specific unique identifiers, mac addresses for these devices and encrypted communications.

It is also desired to provide a system and method that validates commands being sent to a remote energy monitoring or control device such that these commands conform to expected behaviors and meet threshold values.

It is further desired to provide a secondary two-factor authentication approach to anomalous activity ensuring that unexpected behavior or commands that vary from historical trends are valid and desired before allowing these to be performed.

It is still further desired to lock out the control of these devices should the secondary authentication fail, disabling a possible attack vector in the system from further access or monitoring.

Furthermore, it is desired to provide a system and method that employs machine learning in connection with monitoring the access to the devices from external systems both automated and manual. Such a system will learn behaviors and determine anomalous event triggers and can be controlled by a sensitivity level. The system will also monitor outside events that can impact commands outside of historical norms that can include, but are not limited to, holiday schedules, special events, local events, weather and more.

These and other objects are achieved by providing a system for validating control instructions for energy control devices. The system provides a computer with software executing thereon and a storage accessible to the computer. A plurality of control devices are configured to control energy usage by an energy using device and each of the plurality of control devices are connected to the computer via a first network. The computer is connected via a second network to an input device, and the input device sends control instructions to one or more of the plurality of control devices via the computer. The software receives the control instructions and accesses the storage to validate one or more keys contained in the control instructions by determining a validity indication wherein if the one or more keys correspond with data in the storage, the validity indication is an indication that control instructions containing the one or more keys are valid. The software is further configured to compare the control instructions to tolerance data determine if the control instructions are within an allowable tolerance in order to determine the validity indication. If the control instructions are within the allowable tolerance the control instructions are transmitted to the one or more of the plurality of control devices and if the control instructions are not within the allowable tolerance the control instructions are delayed for further validation or not transmitted.

In certain aspects if the validity indication is that the control instructions are valid, the software transmits an instruction to one or more of the plurality of control devices, said instruction modifies energy usage of the energy using device. In certain aspects the one or more keys identify the input device. In other aspects upon the control instructions being delayed for further validation, a secondary authentication of the control instructions is performed.

In certain aspects the secondary authentication is a notification sent to a device which is a device other than the input device. In other aspects the secondary authentication is a notification sent via a communications method other than the first and second networks. In still other aspects the software tracks which input devices transmit invalid control instructions and based on one or more of the input devices exceeding a threshold of invalid control instructions, the data in the storage corresponding to the one or more keys of the one or more of the input devices is modified or removed such that future control instructions from the one or more input devices have keys which do not match the data in the storage such that future control instructions are determined invalid by the software. In yet other aspects the software is further configured to receive a modification to the data to re-activate the one or more keys of the one or more input devices.

Other objects are achieved by providing a method of validating control instructions for energy control devices. The method may include one or more steps of: providing a computer with software executing thereon, said computer having access to a storage; communicating via said software with a plurality of control devices which are configured to control energy usage by a energy using device, each of the plurality of control devices connected to the computer via a first network; receiving, at the computer via a second network, control instructions from an input device which indicate one or more of the plurality of control devices wherein the software accesses the storage to validate one or more keys contained in the control instructions by determining a validity indication wherein if the one or more keys correspond with data in the storage, the validity indication is an indication that control instructions containing the one or more keys are valid; and comparing the control instructions to tolerance data to determine if the control instructions are within an allowable tolerance in order to determine the validity indication such that if the control instructions are within the allowable tolerance the control instructions are transmitted to the one or more of the plurality of control devices and if the control instructions are not within the allowable tolerance the control instructions are delayed for further validation or not transmitted.

In certain aspects the software tracks which input devices transmit invalid control instructions and based on one or more of the input devices exceeding a threshold of invalid control instructions, the data in the storage corresponding to the one or more keys of the one or more of the input devices is modified or removed such that future control instructions from the one or more input devices have keys which do not match the data in the storage such that future control instructions are determined invalid by the software. In certain aspects the software is further configured to receive a modification to the data to re-activate the one or more keys of the one or more input devices.

Other objects are achieved by providing a system for validating control instructions for energy control devices. A computer has software executing thereon and a storage is accessible to the computer. The computer is in communication with a plurality of control devices which are configured to control energy usage by an energy using device, each of the plurality of control devices connected to the computer via a first network. The computer is further via a second network to an input device, the input device sending control instructions to one or more of the plurality of control devices via the computer. The software receives the control instructions from the input device and the software determines if the input device is valid. The software is further configured to compare the control instructions to tolerance data to determine if the control instructions are within an allowable tolerance in order to determine a validity indication such that if the control instructions are within the allowable tolerance the control instructions are transmitted to the one or more of the plurality of control devices and if the control instructions are not within the allowable tolerance the control instructions are delayed for further validation or not transmitted.

In one configuration, a computer having software executing thereon (a monitoring module) is provided for capturing and analyzing commands sent to sensors and energy management devices on a network. The system functions as a facility control firewall and acts to prevent unauthorized access and prevent disruptive commands. All access to sensors at a particular site or location may come through this monitoring module and are authenticated and validated. The system also compares the commands received to expected and predictable commands (historical commands) and has a secondary authentication system using two-factor authentication, or other such secondary validation, to provide an added level of security before issuing the commands to the device.

In another configuration, the system may also act as a normalization layer for commands coming into the devices performing aggregate functions or providing a normalized command syntax between devices. For example, a simple command to turn all the lights off can be issued externally but the facility control system may be required to issue a number of individual commands to lighting control systems throughout the facility. Further, a simple "lights-off" command from the external system may involve differing command syntaxes and formats across the various sensors and controllers in the system. Outside lights, LED lights and florescent lighting controls may be from different manufacturers and have different protocols and command formats.

The software may, in one configuration comprise a single facility control system that receives commands through an encrypted interface such as HTTPS.

A certificate system is used to configure outside end points that are allowed to send commands and to configure sensors within the network to be able to receive commands. A separate administrative interface is used to commission and decommission these certificates; but the facility control system has the ability to validate these as well as revoke them either directly or through the issuance of such revocation commands.

The system also has access to external data feeds such as temperature data, daylight data, weather forecasts as well as news and local events. Such systems also include operational systems which can detail operating hours and schedules for the facility.

The system further utilizes a machine learning engine to validate and adjust commands to improve accuracy of anomalous event detection. For example, if processes and systems change over time, events initially deemed anomalous which were validated with two factor authentication can become the norm and no longer require re-validation.

The system also generates reports, which can be scrutinized and manually adjusted to reset the machine-learned thresholds and parameters such that the two-factor authentication is employed for events that are no longer deemed appropriate through such settings.

The system also has access to a database of information relating to existing equipment and energy savings history from other sites including historical energy usage data from sensors at the same. These are used for benchmarking purposes and these comparative models can be used to suggest thresholds and adjusted settings based on energy efficiency data, which is still the ultimate goal of such energy monitoring systems.

When initially deployed, the system is provisioned with the certificates, mac addresses and access rights associated with external users and systems that can send commands to the system. All such communication will be received over an encrypted protocol such as HTTPS.

The remote systems mac address, IP address, and unique device ID are used to authenticate a specific remote access system or user. This can be an automated controller or an individual user issuing commands through such a connection.

Next, the expected schedule of commands is created. The system proposes a default set with a configurator setting, which includes collecting information such as working schedules and shifts as well as holiday closures etc. The option for connecting external systems to collect such data dynamically is also provided.

In addition to the data, anomalous event thresholds are introduced that will trigger secondary authentication. For example, one may say that the lights-out command should be issued at a threshold such as closing time or later, but never before the threshold. Other settings such as thermostat settings, are provided with threshold values such as never above 80° F. and never less than 70° F., where these settings are tied to operating schedules. As an example, the room temperature may be programmed with thresholds such as: never more than 80° F. after hours, but more less than 74° F. at most one hour before opening, allowing for precooling of the space before it opens for customers.

Other more clear-cut setting such as never allowing the oven to be turned on before opening for safety reasons can be programed. These examples are used for illustration only and there is no limit to the types of commands than can be programmed with the multitude of devices available for remote control and monitoring. The syntax of the programing in the table includes the type of command, the read or write operation for control or data gathering, the absolute time or relative time, such as opening hours or closing hours, daylight or night, winter, or summer.

The system can expect data gathering to occur on an hourly basis. If a system starts to collect data more frequently or at odd intervals, this could be a sign of a possible intruder where a warning may be issued and logged, and secondary authentication may be required before more usage data is sent to the requesting system.

Continuing with the configuration of the system when initially deployed, the secondary authentication method may then be configured. Typically, the code will be sent to an administrator mobile phone number which, then must be entered into the system via a link on a text message or email used in the secondary authentication attempt. In addition to the two-factor authentication described above, additional methods can be implemented including on site biometric readers for fingerprints, security cards, or other methods. In such cases, when the commands are issued locally an override can be performed. As one example, an onsite employee wants to close the facility early and turn the lights off and lock the doors to set the alarm. These commands can be triggered from an internal console to the facility controller, and they may also be tied into a traditional switch. When the system detects the event as anomalous (i.e., too early to shut down), an indicator such as a message or a colored LED may be displayed to indicated that the command or operation is prohibited. To override this indication, a timed authentication must be done using either the onside card reader/biometric reader or the two-factor authentication sent to the store manager on their mobile phone. Once the authentication is validated, the operation can than take effect. If a time out occurs or the operation is not validated, the operation will not be performed and the even will be logged in the system.

Continuing again with the initial configuration, the internal devices in the facility are also programmed into the system, each of which has its own accesses and protocols for communication.

For example, the HVAC settings, the oven settings, and the light controllers are programmed into the facility system with the allowable commands and command syntaxes. These may be MQTT commands or may be other interfaces and protocols supported by the facilities controller.

Further, remote access to power bars or remote-control relays or circuit breakers can be used to turn equipment on or off. Thermostat settings such as, set points, can be configured within certain ranges for HVAC, refrigeration, or freezers and other equipment.

These examples are provided to illustrate variations in possible devices that may be connected to the facility for energy monitoring and control and therefore should not be taken to be limiting.

Additionally, the variables that are used by the machine learning are extensive and are not limited to those mentioned. In fact, a dynamic table of such variables may be generated by the system where continual improvements are made to the estimation process, adjustment and re-estimation continues with a growing set of variables as data gathered and saved through new integrations, new sensors, and new data points. The analysis and correlation of the variables at hand, continues to improve the detection of anomalous activities within the system.

DETAILED DESCRIPTION OF THE INVENTION

Figure 1A:
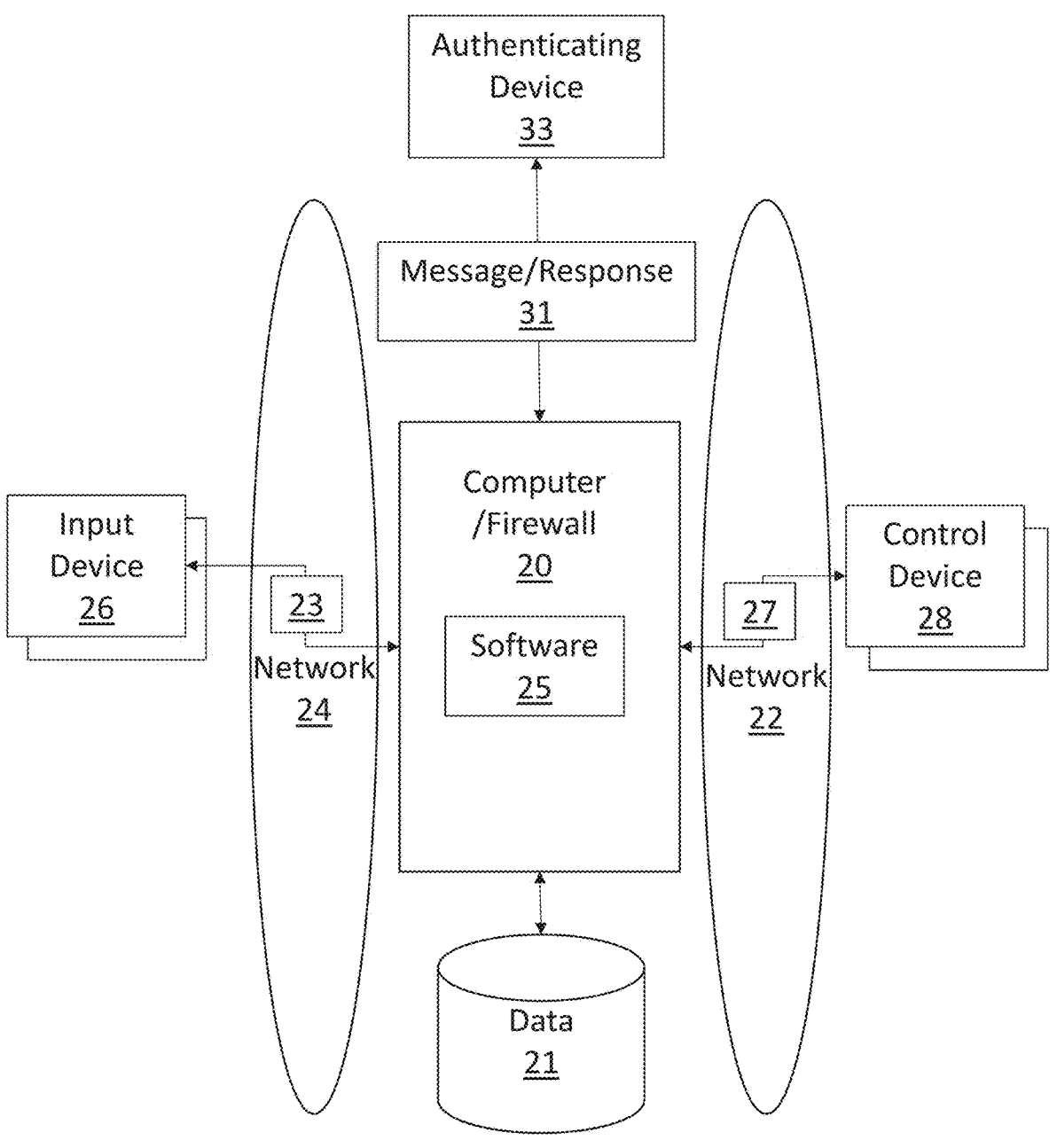
FIG. 1 is a block diagram of the components of the facility control system.

Referring now to Referring to FIG. 1A the computer/firewall 20 includes software 25 executing thereon. The computer 20 and its software 25 act as an intermediary between the input device 26 and the control device 28 in order to validate instructions. The input device 26 may be, for example, a computer, mobile phone, servers/cloud systems or other such computer/processor based devices which can transmit electronic instructions 23 via network 24. The computer 20 is in communication with the control devices 28 via network 22, which may be e.g. a private network for the particular facility where the devices 28 are located. The networks 22/24 are preferably different networks, for example different VPNs, public v. private networks etc.

The instructions 23 will typically include the device identifier or key associated with the input device 26. This key may be e.g. a certificate or other identifier that validates the device the instruction 23 is coming from. The instructions 23 will typically address at least one of the control devices 28, possibly a group of control devices 28. When the software 25 receives the instructions 23, the device ID/key can first be checked against the data 21 in the storage. This data in the storage may include a corresponding key pair, certificate validation data, device id (e.g. MAC address) or a variety of other types of data that can be matched to the key from the instructions 23. Once matched, this confirms the device 26 sending the instructions is (likely) authorized and acts as an initial confirmation that the instructions 23 may be authentic/valid. Once the input device 26 is validated, the instructions 23 are compared against expected instructions based on additional tolerance data contained in the data 21 of the storage. This tolerance data may be indicative of ranges of expected commands/tolerances that relate to the control device 28. It is further understood that the tolerance data may come from a live feed or another external system where the computer/firewall 20 can pull that data. For example, the control device may control an HVAC unit and the expected commands may be weather dependent. Thus, although FIG. 1A shows the storage containing the data 21 which includes tolerance data, that information can be taken from other sources than the storage shown. It is further understood that the data obtained by the software 25 may also be stored in the storage as part of the data 21 for later use. Current weather and weather forecast information may change the tolerances for expected commands. On a cold day in October, it would be expected to turn the heat on whereas on a hot day in October it is anticipated that a command to turn the heat off and cooling on would be within tolerances. Thus, the tolerances can be fixed or dynamic, depending largely on what type of equipment the control device 28 is controlling. In the example of a HVAC system command, if the current weather indicates a cold day in October and the instruction 23 addresses the HVAC system to activate cooling, this would be likely a command outside tolerances (unless e.g. the HVAC system is a server cooling device). With the command outside tolerances, the software 25 will delay the commands 27 that would result from the instruction 23 and the software 25 then generates a second factor authentication which may use a message/response 31 in combination with an authenticating device 33. That authenticating device 33 would be a device other than the input device 26 and/or can use a network other than the network 24 that the instruction 23 came through. The use of a different network may be in whole or in part.

Once the two factor authentication process is completed and the response authenticated, the software 25 can then validate the instructions 23 and generate or pass on the control instruction 27 to the control device 28. It is understood that the control device 28 may be integrated into the underlying equipment or separate.

If the two factor authentication fails, the command 27 would not be sent. Furthermore, if an instruction 23 from an input device 26 is outside tolerances multiple times without successful two factor authentication, the software can revoke permissions for the input device 26 in question. This may be done by modifying the data/certificate to which the device id or key of the input device 26 is matched to as the initial verification step. In this way, until the data 21 is updated with a new certificate, the input device 26 would be rejected without performing the secondary authentication steps. The software 25 can provide a portal/interface allowing for the data 21 to be modified.

Furthermore, when certain types of control instructions are authenticated (e.g. once or repeatedly), the software learns that these instructions are within tolerances and are allowable and thus the tolerance data is updated with information indicative these instructions that initially required secondary authentication such that secondary authentication is not used for future control instructions that correlate to the ones that previously went through secondary authentication.

Thus the system over time will learn which types of instructions are authenticated via the two factor authentication such that two factor authentication is removed at a future point for correlated/similar instructions. One example could be a factory/location that starts up a night shift for production or when hours of a store change and the equipment schedules are adjusted. When adjusted, these changes may be initially flagged as an anomaly requiring secondary verification/authentication but eventually after one or more authentications, the instructions will be considered valid and not require repeated authentication in the future.

Figure 1B:
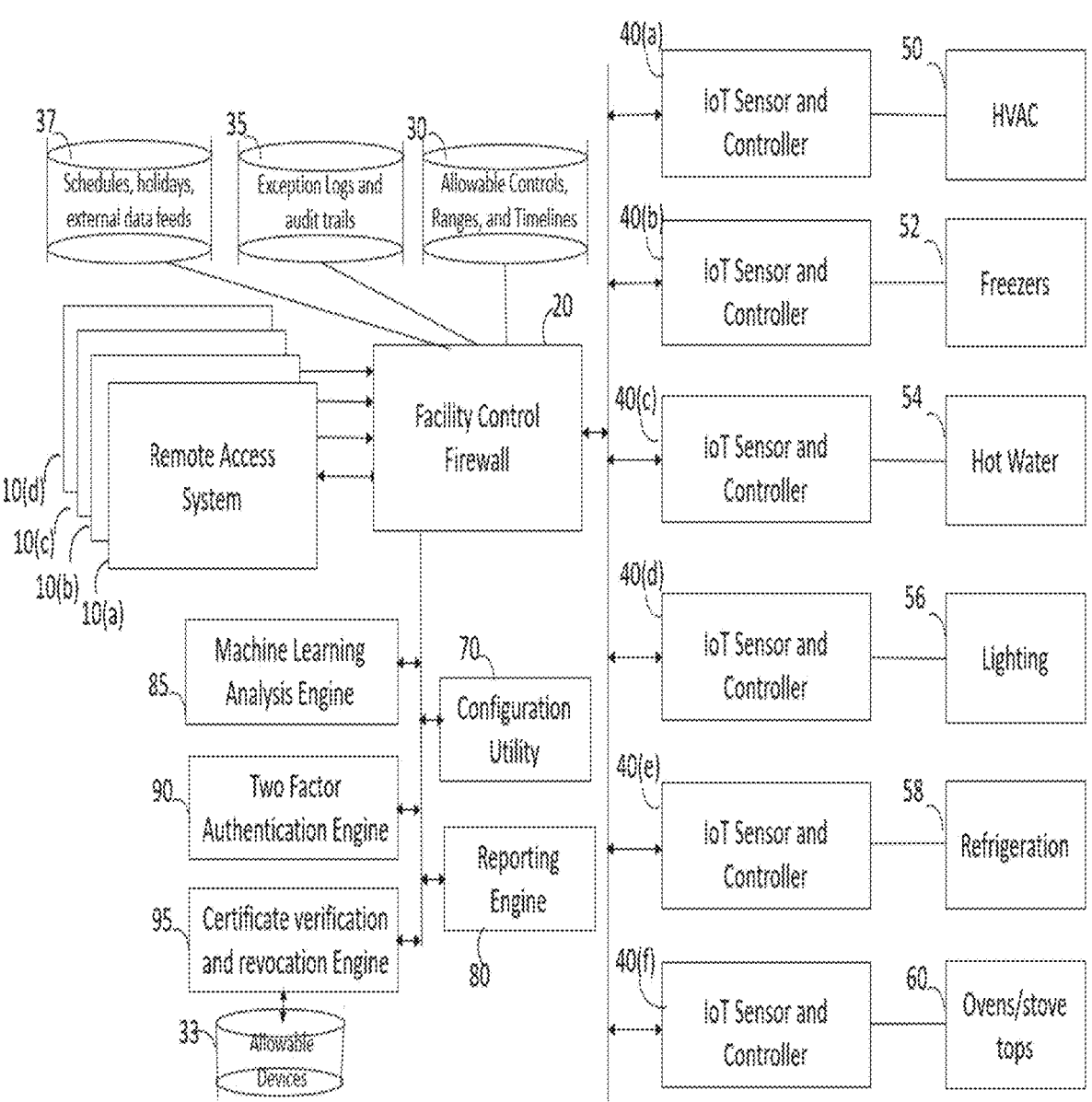

FIG. 1B shows an energy management system is illustrated with its various components.

The facility control system (20) takes remote commands and requests for data from remote access systems (10(a), 10(b), 10(c), 10(d) which may include the input devices 26 to send commands or collect data from a collection of sensors (40(a), 40(b), 40(c), 40(d), 40(e), 40(f)) in the local network which sensors can be consider the control devices 28. These various sensors and controllers 40a-c access the energy monitoring and controlling devices in the system such as, switches or thermostats or energy reporting devices for certain equipment, which may include HVAC (50), freezers (52), hot water heaters (54), lighting systems (56), refrigeration systems (58) and ovens or stove top cooking devices (60). This is just a sample of energy devices and monitoring equipment that may be present, and additionally, these may comprise a remote-controlled switch or breaker that provides the functions needed. These may further comprise energy measurement sensors that report energy readings for power consumed over time for these devices.

The Facility control system (20) verifies the commands received against allowable commands based on the type of command, the source of the command, and the timing of the command using a database of allowable controls (30). These timings and allowances are configured into the facility control system (20) using a configuration utility (70).

Commands received are first validated based on the source of the command using certificate validation engine (95), which validates the sources against a list of allowable devices (33) comprising unique signatures that may be unique codes assigned to devices, validated certificates, as well as mac addresses and network addresses, e.g. keys. If the command received is allowable, it is passed along to the appropriate controller 28 (e.g. 40(a)-40(f)). If the command is not allowed, additional steps are taken by the system including a secondary two-factor authentication engine (90) that can be used to override the anomalous command rejection. If the override is not provided, access to the device can be revoked using the certificate revocation engine (95).

A machine learning engine (85) is used to adapt to changing situations, which adjusts the allowable controls ranges and timelines (30) considering a history of overrides done by two-factor authentication (90) as well as correlating this data with external feeds and schedules (37).

A reporting engine (80) is also provided to analyze the exception logs and audit trails (35) as well as, the current settings of thresholds in the allowable controls, ranges, and timelines (30) database. The configuration utility (70) may also be used to implement changes to the above.

Figure 2:
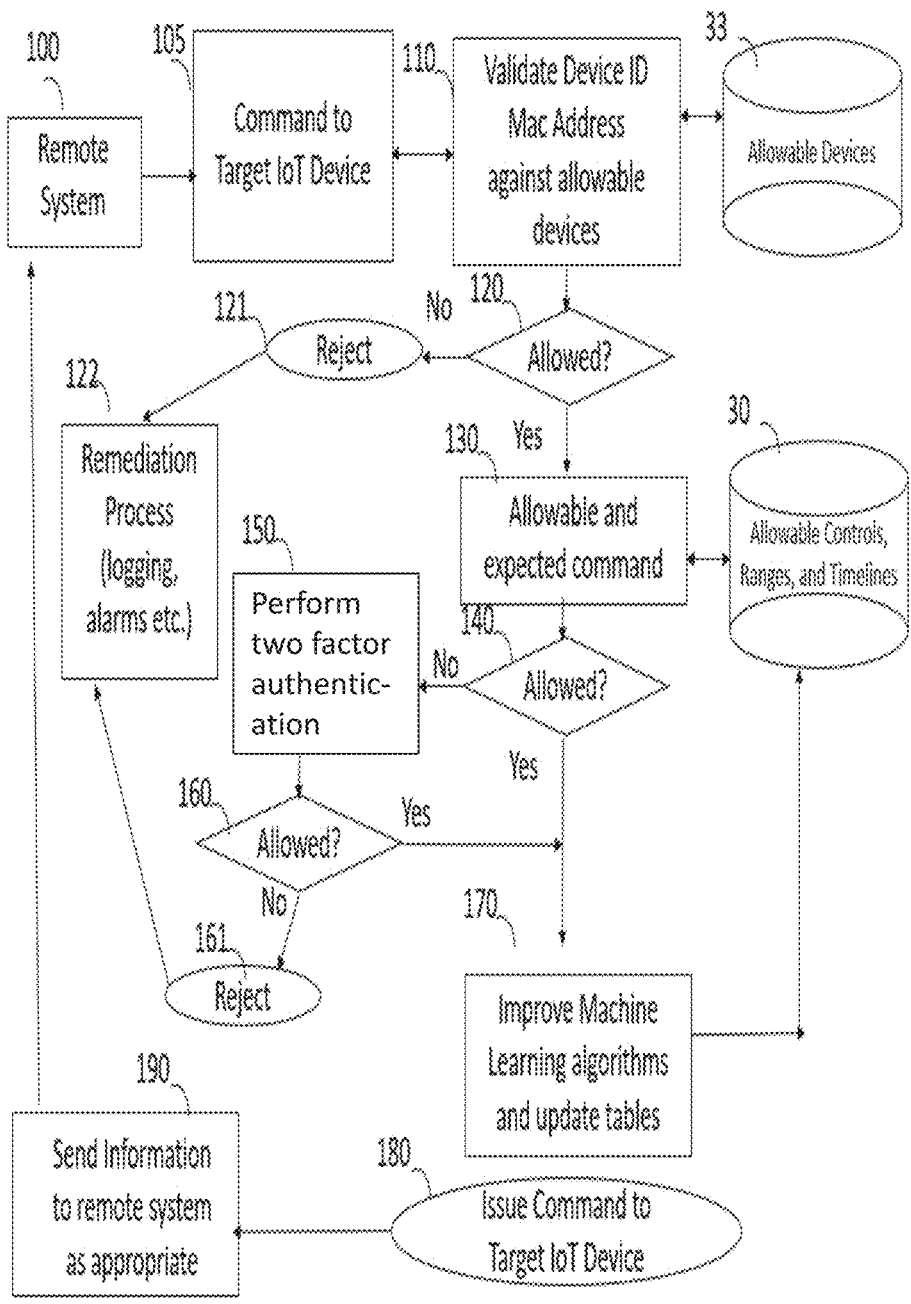
FIG. 2 is a flow diagram according to the system of FIG. 1.

Turning now to FIG. 2, a command flow is illustrated from a remote system (100) to the resultant device (180).

The remote system (100) (e.g. the input device 26) sends a remote command (105) or instruction 23 to the facility control system (20) where validation of the device ID (110) and other components is compared against a table of allowable devices (33). This table may be updated by the facility control system (20) or can be updated externally such as, with the provisioning of new devices or a manual revocation of devices. The table 33 may be part of the data 21 in the storage.

If the remote system (100) is not in the allowable list, the command is rejected (121) and remediation (122) measures may be taken. These remediation (122) measures may include but are not limited to, logging of the attempted action, generating alerts relating to the attempted actions and transmitting those alerts to individuals designated to receive the alerts, locking the device(s) in an "alert" mode that requires an input on the part of an individual to review the event and clear the alert mode (alternatively, the alert mode could be monitored by the machine learning to ensure that the device is functioning properly over time in which case the alert mode can be automatically cleared by the machine learning), automatically identifying the source (e.g., device ID, IP address, or other identifying information) of the rejected command and transmitting that identified source data to individuals designated to receive it, and so on. It is contemplated that the machine learning can track and learn from various intrusions and rejected commands looking at patterns of previously rejected commands including the gathered identification data collected by the system. This may include blacklisting as well as whitelisting certain IP addresses of known personnel as well as blocks of IP addresses coming from geographical areas. In many cases, the remediation requires an 'all clear' to be set in order for the device to operate normally receiving commands again. The specific actions can be specified on a command per command basis in table 240.

Assuming that the command from the remote system (100) is allowed (120) the system validates (130) the command against a set of allowable parameters (30) to ensure the command is expected and appropriate according to information saved in or accessible to the system.

If the command is not allowable (140) two-factor authentication (150) is performed and if not allowed (161) the command is rejected and again remediation (122) measures may be taken. If it is allowed (160) the command sequence is provided to the machine learning module (170), which may update the allowable controls and ranges (30) if appropriate according to information saved in the system.

The command is then issued to the target IoT device (180), and appropriate data is collected and send back (190) to the remote system (100).

Figure 3:
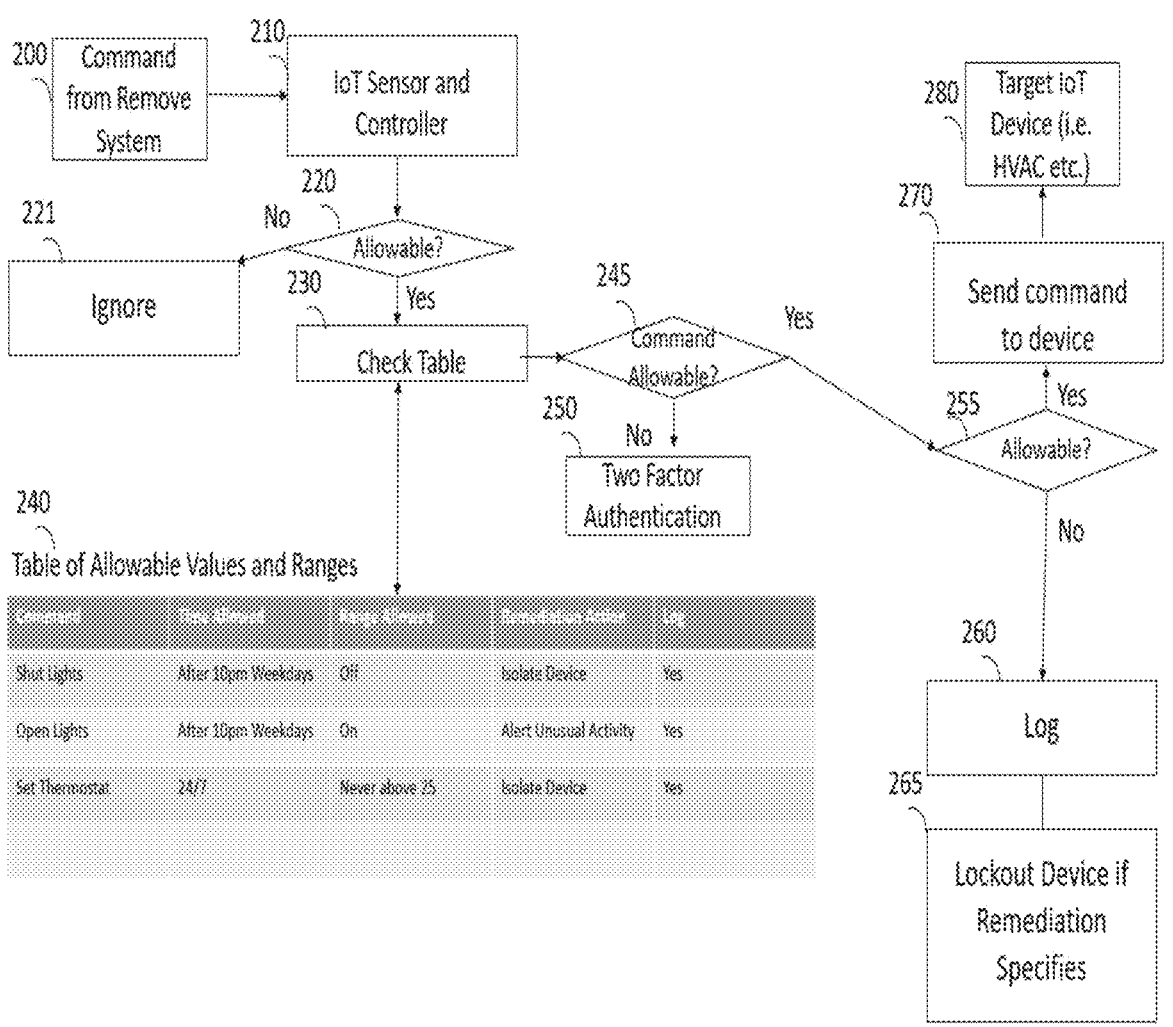
FIG. 3 is a flow diagram illustrating a table-driven method of validation of allowable commands according to the system of FIG. 1.

Turning now to FIG. 3, a table-driven method is illustrated for implementing an allowable command lookup. A command (200) is received from the remote system for a target device (280). It is received by the facility control system (20) and checked to see if it the device initiating the command is allowed (220) to provide the command. If not allowed, the issued command is ignored (221) and remediation processes may be taken.

The system then checks (230) a table of allowable (240) values and ranges which, is setup by the system as part of the configuration process.

The table format is shown in FIG. 3, however one of skill in the art will understand that the formatting may encompass a broad field of commands. FIG. 3 does provide some context of what commands may be included such as a command that is sent (241) to turn off the lights, or set the thermostat, and may further include a time allowable component (242) and/or an allowable range (243) of adjustment. Further, remediation details, which may comprise actions to take (244) and whether to log (245) may be enumerated. This configuration approach allows for flexibility to set thresholds and allowable commands and sequences across devices in the system in a consistent way. Such an approach also allows for normalization of the data that may be required to initiate such an action. While the command to turn off the lights may at first appear to be a simple and straight forward command, the facility may have many rooms, many floors, and may have a large number of different types of lighting devices made by various manufacturers all with different communication structures and formats. As such, even a relatively "simple" command may require issuing many diverse control and command signals to take effect. Again, the idea is to simplify the interface through programming and configuration to provide user-friendly controls for the operation of the facility.

If the command is allowable, then it is sent (270) to the target device (280). If it was determined to be anomalous and not allowable, two-factor authentication (250) is initiated and if allowed (255) the command is sent (270) to the target device (280).

If two-factor authentication (250) fails, the command is logged (260) and the device may be locked out (265) and other remediation processes are initiated.

Figure 4:
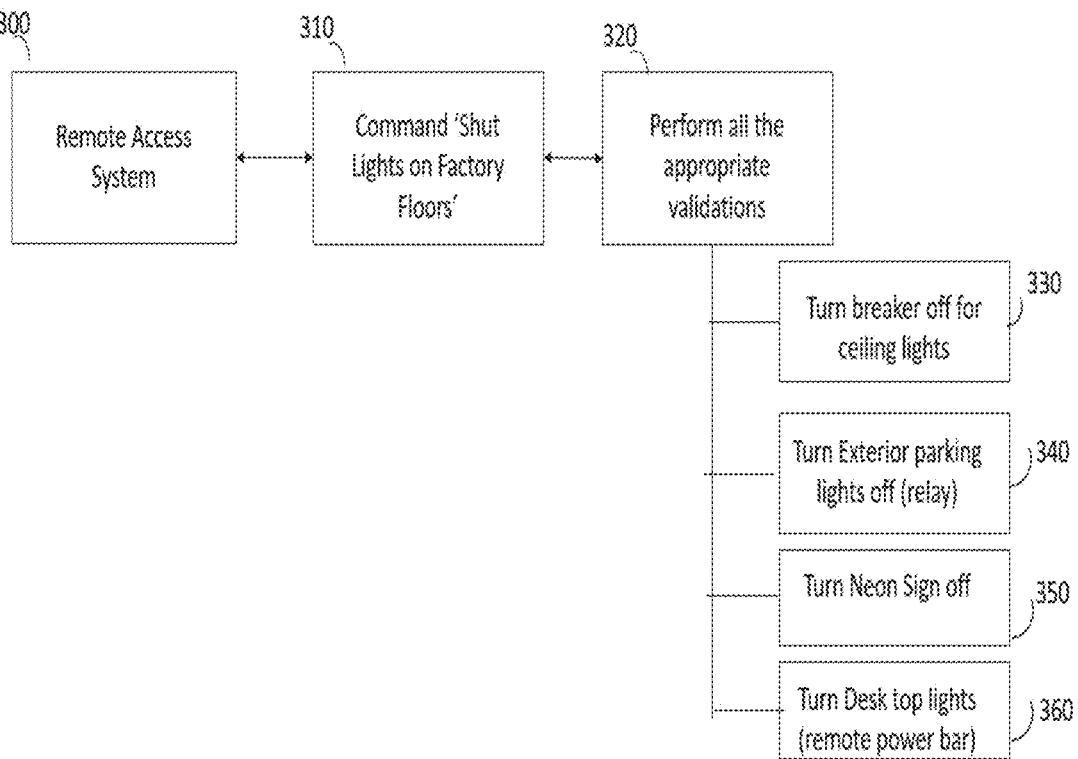
FIG. 4 illustrates normalization of command across devices to provide an aggregate command to end users according to the process of FIG. 3.

Turning now to FIG. 4, an example of normalization of command across devices to provide a simple aggregate command to end users is illustrated. A remote access system (300) issues a command (310) to the facility control system, which performs all the necessary validations (320) described in the previous examples and figures above. When validation has occurred, the aggregate command issued to 'shut off the factory floor lights' in this case, is broken down into numerous commands that are issued by the facilities control system to the end devices. For example, the ceiling lights (330) are controlled by a remote-control breaker, and this is switched, the exterior parking lights (340) are controlled by a relay, which is switched, the neon sign (350) is also on a separate circuit and is switched off, and a number of desktop lights (360) are controlled by remote power bars, which are also cycled off. The example is one of many and used to illustrate how the system provides a user-friendly context sensitive command for the day-to-day operations of the facility and translates this into potentially many individual controls and commands. In some cases, these may comprise different protocols, and different command sequences. Even in the example above the desk top lamps (360) may be controlled by multiple different devices, such as, a switchable wall socket, a remote switchable power bar, and each of these may have their own unique communication structure and format. When the devices are configured into the system, the communication structure, format, and protocols for the particular device are saved into the system. The functional aspect of the components, in this case lights, is also programmed to allow for such aggregate commands. Although the invention has been described with reference to a particular arrangement of parts, features, and the like, these are not intended to exhaust all possible arrangements or features, and indeed many other modifications and variations will be ascertainable to those of skill in the art.

What is claimed is:

1. A system for validating control instructions for energy control devices comprising:
    a computer with software executing thereon;
    a storage accessible to the computer;
    a plurality of control devices which are configured to control energy usage by a energy using device, each of the plurality of control devices connected to the computer via a first network;

the computer connected via a second network to an input device, the input device sending control instructions to one or more of the plurality of control devices via the computer;
    wherein the software receives the control instructions and accesses the storage to validate one or more keys contained in the control instructions by determining a validity indication wherein if the one or more keys correspond with data in the storage, the validity indication is an indication that control instructions containing the one or more keys are valid;
    the software further configured to compare the control instructions to tolerance data to determine if the control instructions are within an allowable tolerance in order to determine the validity indication such that if the control instructions are within the allowable tolerance the control instructions are transmitted to the one or more of the plurality of control devices and if the control instructions are not within the allowable tolerance the control instructions are delayed for further validation or not transmitted.

2. The system of claim 1, wherein if the validity indication is that the control instructions are valid, the software transmitting an instruction to one or more of the plurality of control devices, said instruction modifies energy usage of the energy using device.

3. The system of claim 1, wherein the one or more keys identify the input device.

4. The system of claim 1, wherein upon the control instructions being delayed for further validation, a secondary authentication of the control instructions is performed.

5. The system of claim 4, wherein the secondary authentication is a notification sent to a device which is a device other than the input device.

6. The system of claim 4, wherein the secondary authentication is a notification sent via a communications method other than the first and second networks.

7. The system of claim 1, wherein said software tracks which input devices transmit invalid control instructions and based on one or more of the input devices exceeding a threshold of invalid control instructions, the data in the storage corresponding to the one or more keys of the one or more of the input devices is modified or removed such that future control instructions from the one or more input devices have keys which do not match the data in the storage such that future control instructions are determined invalid by the software.

8. The system of claim 7, wherein said software is further configured to receive a modification to the data to re-activate the one or more keys of the one or more input devices.

9. A method of validating control instructions for energy control devices comprising:
    providing a computer with software executing thereon, said computer having access to a storage;
    communicating via said software with a plurality of control devices which are configured to control energy usage by a energy using device, each of the plurality of control devices connected to the computer via a first network;
    receiving, at the computer via a second network, control instructions from an input device which indicate one or more of the plurality of control devices wherein the software accesses the storage to validate one or more keys contained in the control instructions by determining a validity indication wherein if the one or more keys correspond with data in the storage, the validity indication is an indication that control instructions containing the one or more keys are valid;

comparing the control instructions to tolerance data to determine if the control instructions are within an allowable tolerance in order to determine the validity indication such that if the control instructions are within the allowable tolerance the control instructions are transmitted to the one or more of the plurality of control devices and if the control instructions are not within the allowable tolerance the control instructions are delayed for further validation or not transmitted.

10. The method of claim 9, wherein if the validity indication is that the control instructions are valid, the software transmitting an instruction to one or more of the plurality of control devices, said instruction modifies energy usage of the energy using device.

11. The method of claim 9, wherein the allowable tolerance is indicative of an expected range of commands, an expected frequency of commands, an expected time for commands and combinations thereof.

12. The method of claim 9, wherein upon the control instructions being delayed for further validation, a secondary authentication of the control instructions is performed.

13. The method of claim 12, wherein the secondary authentication is a notification sent to a device which is a device other than the input device.

14. The method of claim 12, wherein the secondary authentication is a notification sent via a communications method other than the first and second networks.

15. The method of claim 12, wherein upon completion of secondary authentication for a first of one or more control instructions on one or more occasions the tolerance data is updated with information indicative of the first of the one or more control instructions such that secondary authentication is not used for future control instructions that correlate to the first of the one or more control instructions.

16. The method of claim 9, wherein said software tracks which input devices transmit invalid control instructions and based on one or more of the input devices exceeding a threshold of invalid control instructions, the data in the storage corresponding to the one or more keys of the one or more of the input devices is modified or removed such that future control instructions from the one or more input devices have keys which do not match the data in the storage such that future control instructions are determined invalid by the software.

17. The method of claim 16, wherein said software is further configured to receive a modification to the data to re-activate the one or more keys of the one or more input devices.

18. A system for validating control instructions for energy control devices comprising:

a computer with software executing thereon;

a storage accessible to the computer;

said computer in communication with a plurality of control devices which are configured to control energy usage by a energy using device, each of the plurality of control devices connected to the computer via a first network;

the computer connected via a second network to an input device, the input device sending control instructions to one or more of the plurality of control devices via the computer;

wherein the software receives the control instructions from the input device and the software determines if the input device is valid;

the software further configured to compare the control instructions to tolerance data to determine if the control instructions are within an allowable tolerance in order to determine a validity indication such that if the control instructions are within the allowable tolerance the control instructions are transmitted to the one or more of the plurality of control devices and if the control instructions are not within the allowable tolerance the control instructions are delayed for further validation or not transmitted.

19. The system of claim 18, wherein upon the control instructions being delayed for further validation, a secondary authentication of the control instructions is performed.

20. The system of claim 19, wherein if the secondary authentication is successful, the validity indication is that the control instructions are valid and the software transmits an instruction to one or more of the plurality of control devices, said instruction modifies energy usage of the energy using device.

* * * * *